US012683386B2

(12) United States Patent
Lu et al.

(10) Patent No.: US 12,683,386 B2
(45) Date of Patent: Jul. 14, 2026

(54) CIRCUIT TO IMPROVE ETHERNET IMMUNITY TO ELECTRICAL FAST TRANSIENT

(71) Applicant: Rockwell Automation Technologies, Inc., Mayfield Heights, OH (US)

(72) Inventors: Haihui Lu, Shanghai (CN); David D. Brandt, New Berlin, WI (US); Caleb J. Palagyi, Sagamore Hills, OH (US); Joseph M. Futey, Seven Hills, OH (US); Brian R. Campbell, Brecksville, OH (US); Neal R. Krejci, Seven Hills, OH (US); Zhijie Gong, Shanghai (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 53 days.

(21) Appl. No.: 18/434,439

(22) Filed: Feb. 6, 2024

(65) Prior Publication Data

US 2025/0253649 A1      Aug. 7, 2025

(51) Int. Cl.
    *H02H 9/04*          (2006.01)
(52) U.S. Cl.
    CPC ..................................... *H02H 9/04* (2013.01)
(58) Field of Classification Search
    CPC .............................. H03K 17/08; G01R 31/3277
    USPC ........................................................ 361/119
    See application file for complete search history.

(56) References Cited

U.S. PATENT DOCUMENTS

| | | | |
|---|---|---|---|
| 5,283,638 A | * | 2/1994 | Engberg ............... H04M 11/066 |
| | | | 700/83 |
| 5,321,575 A | * | 6/1994 | Shilo ...................... H02H 9/041 |
| | | | 361/111 |

| | | | |
|---|---|---|---|
| 7,768,761 B2 | | 8/2010 | Harris |
| 7,804,223 B1 | * | 9/2010 | Teowee .................. F42C 9/147 |
| | | | 310/318 |
| 8,179,656 B2 | | 5/2012 | Jones et al. |

(Continued)

FOREIGN PATENT DOCUMENTS

| | | |
|---|---|---|
| CN | 201629463 U | 11/2010 |
| CN | 201656463 U | 11/2010 |

(Continued)

OTHER PUBLICATIONS

European Search Report issued by the European Patent Office for European application No. EP 25155737 mailed Jul. 11, 2025, 39 pages.

*Primary Examiner* — Dharti H Patel

(57)                    ABSTRACT

The present technology relates to circuitry immunity to electrical interference, such as Electrical Fast Transient (EFT) interference. In an example embodiment, an interference dissipation circuit is provided. The interference dissipation circuit includes a transient voltage suppression (TVS) sub-circuit, a ferrite bead having a first terminal and a second terminal, a capacitor coupled in series with the ferrite bead and having a first terminal and a second terminal. The TVS sub-circuit includes a plurality of TVS ports, and the TVS sub-circuit is coupled to the set of output ports at a first set of TVS ports of the plurality of TVS ports. The ferrite bead is coupled to a ground port of the plurality of TVS ports, the second terminal of the ferrite bead is coupled to the first terminal of the capacitor, and the second terminal of the capacitor is coupled to a chassis in an industrial automation environment.

20 Claims, 5 Drawing Sheets

(56) References Cited

U.S. PATENT DOCUMENTS

| | | | | |
|---|---|---|---|---|
| 8,421,929 | B2 * | 4/2013 | Joo | H04N 5/63 |
| | | | | 348/730 |
| 11,451,051 | B2 | 9/2022 | Doynov et al. | |
| 11,626,721 | B2 * | 4/2023 | Agliata | H02H 7/04 |
| | | | | 361/35 |
| 2005/0201035 | A1 * | 9/2005 | Buckmeier | H01R 13/6666 |
| | | | | 361/118 |
| 2006/0025104 | A1 | 2/2006 | Reed | |
| 2008/0037192 | A1 * | 2/2008 | Huang | H05K 1/026 |
| | | | | 361/118 |
| 2008/0062600 | A1 * | 3/2008 | Crawley | H04L 25/0276 |
| | | | | 361/56 |
| 2008/0062606 | A1 * | 3/2008 | Brown | H02H 9/042 |
| | | | | 361/111 |
| 2009/0141414 | A1 * | 6/2009 | Hsu | H02H 9/005 |
| | | | | 361/56 |
| 2010/0061028 | A1 * | 3/2010 | Lestician | H01F 27/343 |
| | | | | 361/111 |
| 2020/0214117 | A1 * | 7/2020 | Chang | G08B 7/06 |
| 2021/0144491 | A1 * | 5/2021 | Landolt | H04R 1/1041 |
| 2021/0303046 | A1 * | 9/2021 | Trainor | G06F 13/4068 |
| 2021/0344227 | A1 * | 11/2021 | Kovacs | H02J 50/005 |
| 2021/0345520 | A1 * | 11/2021 | Los | H01F 27/38 |
| 2023/0403834 | A1 * | 12/2023 | Li | H03H 7/06 |
| 2024/0260150 | A1 * | 8/2024 | Puvanakijakorn | H05B 45/14 |
| 2025/0199049 | A1 * | 6/2025 | Griffiths | G01R 31/086 |
| 2025/0202223 | A1 * | 6/2025 | Griffiths | H02H 3/16 |
| 2025/0202731 | A1 * | 6/2025 | Griffiths | H04L 12/10 |

FOREIGN PATENT DOCUMENTS

| | | | | |
|---|---|---|---|---|
| CN | 210667163 | U | * 6/2020 | |
| CN | 111901012 | A | 11/2020 | |
| EP | 4529024 | A1 | * 3/2025 | H04L 25/0266 |

* cited by examiner

100

Chassis 101

Controller 105

Network Interface System
110-1

Physical Layer Circuit
111-1

Transformer Circuit
112-1

Cable Layer Circuit
113-1

Chassis 102

Drive 106

Network Interface System
110-2

Physical Layer Circuit
111-2

Transformer Circuit
112-2

Cable Layer Circuit
113-2

Network
115

Devices
120

CIRCUIT TO IMPROVE ETHERNET IMMUNITY TO ELECTRICAL FAST TRANSIENT

RELATED APPLICATIONS

This application is related to U.S. patent application No. 18/434,480 filed on Feb. 6, 2024 and issued as U.S. Pat. No. 12,413,215 on Sep. 9, 2025, titled "COMMON MODE TERMINATION MATCHING METHOD FOR DIGITAL COMMUNICATIONS", which is hereby incorporated by reference in its entirety.

TECHNICAL FIELD

Various embodiments of the present technology relate to circuitry immunity to electrical interference, and particularly, to dissipating interference caused by Electrical Fast Transient (EFT) bursts.

BACKGROUND

Electronic equipment and electrical products operating in industrial and commercial environments are subject to standards, requirements, and other compatibility specifications set by the International Electrotechnical Commission (IEC). One standard mandated by the IEC relates to Electrical Fast Transient (EFT) testing. EFT testing is an immunity standard used to test how electronic equipment and electrical products operate under interference. EFT testing may include different tests to determine whether devices and products are compatible with fast transients, such as power line transients and electrostatic discharge. A future requirement under EFT testing includes a 100 kHz EFT test.

In systems involving low-voltage communications, such as communications via Ethernet cabling, solutions include using fixed-value resistors, capacitors, and/or inductors to match an impedance of an interference signal introduced during an EFT test. However, such solutions yield impedance mismatching across different frequency ranges, which may cause noise to disrupt operations of the electrical components of the system and even damage components thereof. Other existing solutions may include transient voltage suppression diodes that may be coupled to ground nodes to dissipate interference introduced during EFT tests. These solutions may also fail to match the impedance of transients in various frequency ranges causing similar issues.

SUMMARY

Systems, devices, and methods are provided herein for improving immunity to electrical interference in circuitry and cabling, and more particularly, to dissipating interference from electrical fast transients (EFTs) through an interference dissipation circuit including a ferrite bead. An industrial or commercial environment may include various industrial automation devices, such as variable-speed drives, motors, and the like, that perform industrial automation processes. Some of these devices may be coupled together using low-voltage cabling, such as Ethernet cables, to establish communications among each other via a communication network. During operation, interference or noise may be injected to these devices, which may distort signals provided by or provided to the devices, and ultimately, may disrupt functionality or damage components of the devices. One example of such interference may be interference from EFT bursts. As described herein, EFT interference may be dissipated using an interference dissipation circuit included in devices in the industrial environment. Performance of the interference dissipation circuit may be tuned based on the amount of EFT interference, the impedance of the interference, or the frequency of the interference.

In an embodiment of the present technology, a network interface system including a transformer circuit, a physical layer circuit, and a cable side circuit is provided. The transformer circuit includes a plurality of transformer ports, including a first set of transformer ports and a second set of transformer ports. The physical layer circuit is coupled to the transformer circuit at the second set of transformer ports. The cable side circuit is coupled to the transformer circuit at the first set of transformer ports. The cable side circuit includes a connector port, including a receptacle and a set of output ports that couple to a subset of the first set of ports, and an interference dissipation circuit, including a transient voltage suppression (TVS) sub-circuit, a ferrite bead having a first terminal and a second terminal, a capacitor coupled in series with the ferrite bead and having a first terminal and a second terminal. The TVS sub-circuit includes a plurality of TVS ports, and the TVS sub-circuit is coupled to the set of output ports at a first set of TVS ports of the plurality of TVS ports. The ferrite bead is coupled to a ground port of the plurality of TVS ports, the second terminal of the ferrite bead is coupled to the first terminal of the capacitor, and the second terminal of the capacitor is coupled to a chassis in an industrial automation environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

While multiple embodiments are disclosed, still other embodiments of the present technology will become apparent to those skilled in the art from the following detailed description, which shows and describes illustrative embodiments of the invention. As will be realized, the technology is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
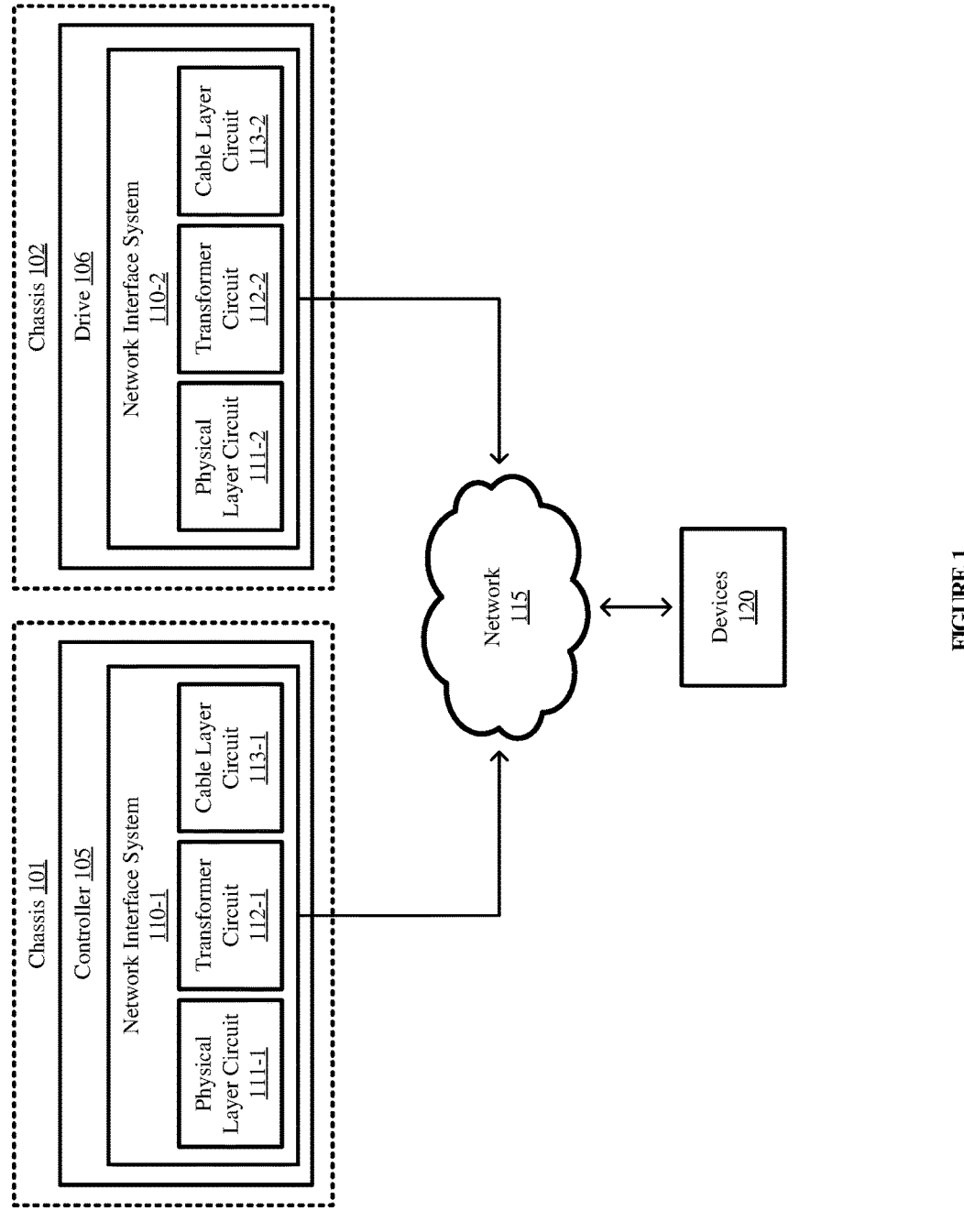
FIG. 1 illustrates an example operating environment in accordance with some embodiments of the present technology.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology relate to improving immunity to electrical interference in circuitry and cabling. An industrial or commercial environment may include various industrial automation devices, such as variable-speed drives, motors, and the like, that perform industrial automation processes. Some of these devices may be coupled together using low-voltage cabling, such as unshielded Ethernet cables, to establish communications among each other via a communication network. During operation, interference or noise may be injected to these devices, which may distort signals provided by or provided to the devices, and ultimately, may disrupt functionality or damage components of the devices. One example of such interference may be Electrical Fast Transient (EFT) interference.

To address issues arising from electrical interference, a network interference system may be included in industrial or commercial devices operating in an industrial automation environment to dissipate noise and reduce resonant ringing of the noise. As described herein, EFT interference may be dissipated using an interference dissipation circuit included in devices in the industrial automation environment. Performance of the interference dissipation circuit may be tuned based on the amount of EFT interference, the impedance of the interference, or the frequency of the interference. More specifically, components and characteristics thereof of an interference dissipation circuit, including a ferrite bead, may be selected to match an impedance of interference and dissipate such interference based on such factors.

In an embodiment of the present technology, a network interface system including a transformer circuit, a physical layer circuit, and a cable side circuit is provided. The transformer circuit includes a plurality of transformer ports, including a first set of transformer ports and a second set of transformer ports. The physical layer circuit is coupled to the transformer circuit at the second set of transformer ports. The cable side circuit is coupled to the transformer circuit at the first set of transformer ports. The cable side circuit includes a connector port, including a receptacle and a set of output ports that couple to a subset of the first set of ports, and an interference dissipation circuit, including a transient voltage suppression (TVS) sub-circuit, a ferrite bead having a first terminal and a second terminal, a capacitor coupled in series with the ferrite bead and having a first terminal and a second terminal. The TVS sub-circuit includes a plurality of TVS ports, and the TVS sub-circuit is coupled to the set of output ports at a first set of TVS ports of the plurality of TVS ports. The ferrite bead is coupled to a ground port of the plurality of TVS ports, the second terminal of the ferrite bead is coupled to the first terminal of the capacitor, and the second terminal of the capacitor is coupled to a chassis in an industrial automation environment.

In another embodiment, an interference dissipation circuit is provided. The interference dissipation circuit includes a transient voltage suppression (TVS) sub-circuit, a ferrite bead having a first terminal and a second terminal, a capacitor coupled in series with the ferrite bead and having a first terminal and a second terminal. The TVS sub-circuit includes a plurality of TVS ports, and the TVS sub-circuit is coupled to the set of output ports at a first set of TVS ports of the plurality of TVS ports. The ferrite bead is coupled to a ground port of the plurality of TVS ports, the second terminal of the ferrite bead is coupled to the first terminal of the capacitor, and the second terminal of the capacitor is coupled to a chassis in an industrial automation environment.

Advantageously, the disclosed system can provide interference dissipation for different types of electrical interference, such as common-mode impedance interference and electrical fast transient interference, among several frequency ranges. The components of the system can be adjusted based on an amount of interference identified in signals passing through the system. Accordingly, devices that connect to other devices or system in an industrial automation environment may be capable of passing electrical interference injection tests, such as a 100 kHz EFT test, by including components, such as a ferrite bead, that can match impedances of interference at terminations within the devices. While existing solutions may include a ferrite bead attached to a cable or external to an interference system, such solutions are not used internally in components to address interference issues caused by external cables or environments. Additionally, other existing solutions may include resistors, inductors, capacitors, or any combination thereof, however, such solutions lack the robustness and characteristics of a ferrite bead to reduce interference. Thus, not only does the network interface system disclosed herein improve device and system performance in an industrial automation environment by reducing noise and interference that can reach elements of the system, but also it can meet mandated electrical interference requirements by reducing interference within an environment.

Turning now to the Figures, FIG. 1 illustrates an example operating environment in accordance with some embodiments of the present technology. FIG. 1 includes operating environment 100, which is representative of an environment in which industrial and commercial processes may be performed. Operating environment 100 includes chassis 101, chassis 102, and devices 120, which each include components connected to network 115. Chassis 101 further includes controller 105 and network interface system 110-1, which includes physical layer circuit 111-1, transformer circuit 112-1, and cable side circuit 113-1. Chassis 102 further includes drive 106 and network interface system 110-2, which includes physical layer circuit 111-2, transformer circuit 112-2, and cable side circuit 113-2.

Chassis 101 and chassis 102 may be representative of structural frameworks, racks, or other support devices that can include internal and external supporting structures on which industrial, commercial, and industrial automation devices can be mounted, attached, placed, or otherwise affixed to. Chassis 101 and chassis 102 can provide protective grounding for electrical signals transmitted to and received from devices in or on chassis 101 and chassis 102, respectively. In this example, chassis 101 may include controller 105, and chassis 102 may include drive 106. In other examples, additional or different devices may be included in either chassis 101 or chassis 102, such as network controllers, logic controllers, I/O modules and adapters, chassis-based communication modules, Ethernet IP adapters, network cards, other networking equipment, and the like.

Controller 105 may be representative of a controller, control device, or control module capable of controlling operations, communications, and other functions of an industrial automation device and communicating with one or more devices, including the industrial automation device, over network 115. In various examples, controller 105 may include one or more processors or processing devices and accompanying circuitry. Examples of the processors include a general processing unit, a central processing unit (CPU), a microcontroller, a programmable logic controller, a digital signal processor, an application-specific integrated circuit (ASIC), field-programmable logic devices, and the like, as well as any combination or variation thereof. For example, controller 105 may be a programmable logic controller (PLC), a network controller, or the like.

Controller 105 may include network interface system 110-1, which includes physical layer circuit 111-1, transformer circuit 112-1, and cable side circuit 113-1. Network interface system 110-1 may be representative of one or more devices, circuits, and components capable of connecting controller 105 to network 115 and protecting controller 105, and an associated industrial automation device, from electrical interference, such as common-mode impedance interference. In various examples, network interface system 110-1 may be implemented in or around a port, coupling, receptacle, or other interface device of controller 105, such as in or around an RJ45 connector of controller 105.

Drive 106 may be representative of an industrial drive capable of driving operations of one or more industrial, commercial, or industrial automation devices in an industrial automation environment. Examples of drive 106 may include a distributed servo drive (DSD) and a distributed servo motor (DSM), among other types of drives.

Drive 106 may include network interface system 110-2, which includes physical layer circuit 111-2, transformer circuit 112-2, and cable side circuit 113-2. Network interface system 110-2, like network interface system 110-1, may be representative of one or more devices, circuits, and components capable of connecting drive 106 to network 115 and protecting drive 106, and one or more associated industrial automation devices, from electrical interference, such as common-mode impedance interference. In various examples, network interface system 110-2 may be implemented in or around a port, coupling, receptacle, or other interface device of drive 106, such as in or around an RJ45 connector of drive 106.

Physical layer circuits 111-1 and 111-2 (collectively physical layer circuits 111) may be representative of circuitry capable of providing a physical layer (PHY) interface between network 115 and components of controller 105 or drive 106. Physical layer circuits 111 may include various electrical and electronic components, such as resistors, capacitors, inductors, and the like, and cabling or wires connecting the components thereof.

Transformer circuits 112-1 and 112-2 (collectively transformer circuits 112) may include transformer circuitry to provide a power interface between cable side circuits 113 and physical layer circuits 111. Transformer circuits 112 may include a transformer, a plurality of ports, and other electrical and electronic components. Physical layer circuits

111 may be coupled to transformer circuits 112 at a first set of the ports. Cable side circuits 113 may be coupled to transformer circuits 112 at a second set of the ports. Other sets of ports may also be included and used to couple transformer circuits 112 to other circuit components, such as a transient suppression diode (TVS) circuit. Using the ports, transformer circuits 112 can provide power to respective circuits and components.

Cable side circuits 113-1 and 113-2 (collectively cable side circuits 113) may be representative of circuitry capable of providing an interface between controller 105 and drive 106, and components thereof, and a cable (e.g., an unshielded Ethernet cable) connecting network interface systems 110 to network 115. Cable side circuits 113 may include various electrical and electronic components, such as resistors, capacitors, inductors, and the like, and cabling or wires connecting the components thereof.

In various examples, cable side circuits 113 may include an interference dissipation circuit capable of dissipating interference from electrical fast transients (EFTs), among other types of interference, introduced to network interface systems 110 via a communication cable coupled to ports of cable side circuits 113. The interference dissipation circuit may include a transient voltage suppression (TVS) sub-circuit, a ferrite bead, and a capacitor coupled in series with the ferrite bead. The TVS sub-circuit may include a plurality of ports. A first set of the TVS ports may be coupled to a set of output ports of cable side circuits 113. The ferrite bead may have a first terminal and a second terminal, and the capacitor coupled to the ferrite bead may have a first terminal and a second terminal. The first terminal of the ferrite bead may be coupled to a ground port of the TVS ports, the second terminal of the ferrite bead may be coupled to the first terminal of the capacitor, and the second terminal of the capacitor may be coupled to a chassis (e.g., chassis 101, chassis 102) in the industrial automation environment. In other examples, the EFT interference dissipation circuit may instead, or additionally, be coupled to physical layer circuits 111 at the first set of ports of transformer circuits 112.

Cable side circuits 113 may also include a second interference dissipation circuit capable of dissipating common-mode impedance introduced to network interface systems 110 via a communication cable coupled to ports of cable side circuits 113. The second interference dissipation circuit may include one or more resistors coupled in series with one or more capacitors. The resistance of the one or more resistors and the capacitance of the one or more capacitors may be selected manually or automatically based on an identified amount of common-mode impedance interference at a given time, such as to match the impedance of the interference to reduce resonant ringing.

Network interface systems 110 may be coupled to network 115 at cable side circuits 113 of network interface systems 110 via physical connections. The physical connections may be made using low-voltage cabling and connectors and receptacles at both cable side circuits 113 and network 115. In an example, cable side circuits 113 may include receptacles for coupling with Registered Jack-45 (RJ45) connectors of Ethernet cabling. Each pair of wires of an Ethernet cable may be coupled to a different receptacle or port of cable side circuits 113. In various examples, the Ethernet cabling may include any number of pairs. Other connectors may also be used.

Network 115 may be representative of a communication network established in an industrial automation environment via one or more communication protocols. When controller 105 and drive 106 are connected to network 115 via network interface systems 110-1 and 110-2, respectively, controller 105 and drive 106 may communicate with each other and with other devices 120 in an industrial automation environment also connected to network 115.

Devices 120 may be representative of any devices, systems, circuits, or components in an industrial automation environment. Examples of devices 120 may include actuators, sensors, drives, motors, belts, controllers, and more. In this example, devices 120 may not include a network interface system like controller 105 or drive 106.

Figure 2:
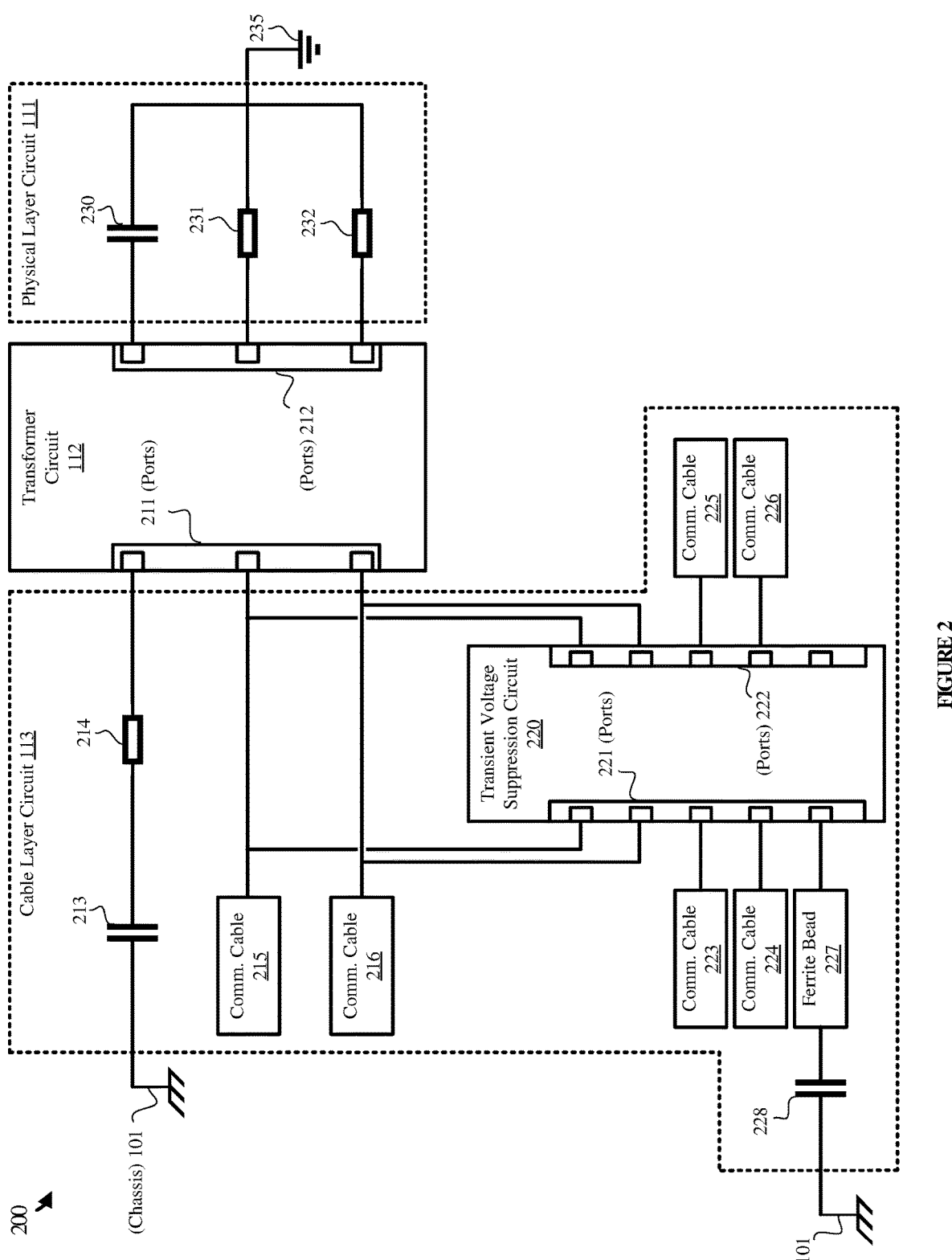
FIG. 2 illustrates an example block diagram of a network interface system in accordance with some embodiments of the present technology.

FIG. 2 illustrates an example block diagram of a network interface system in accordance with some embodiments of the present technology. FIG. 2 includes network interface system 200, which includes chassis 101, physical layer circuit 111, transformer circuit 112, cable side circuit 113, and ground node 235. Network interface system 200 may be representative of and include components of network interface system 110 of FIG. 1.

Network interface system 200 may be representative of one or more devices, circuits, and components capable of connecting an industrial or commercial device (e.g., controller 105, drive 106) to a communication network (e.g., network 115) and protecting a connected device from electrical interference, such as from electrical fast transients (EFTs). In various examples, network interface system 200 may be implemented in or around a port, coupling, receptacle, or other interface device of an industrial device, such as in or around a Registered-Jack 45 (RJ45) connector of the industrial device.

Physical layer circuit 111 may be representative of circuitry capable of providing a physical layer (PHY) interface between the communication network or a network device (e.g., a switch) connected to the communication network and components of an industrial device in which physical layer circuit 111, transformer circuit 112, and cable side circuit 113 may be included, such as a controller (e.g., controller 105), a drive (e.g., drive 106), or another industrial or commercial device. Physical layer circuits 111 may include various electrical and electronic components, such as resistors, capacitors, inductors, and the like, and cabling or wires connecting the components thereof.

More specifically, physical layer circuit 111 includes capacitor 230, resistor 231, and resistor 232. Each of capacitor 230, resistor 231, and resistor 232 may have respective characteristic values based on desired performance of physical layer circuit 111. In one example, capacitor 230 may have a capacitance of 0.1 microfarads (μF) and resistors 218 and 219 may have resistances of 50 Ohms. Each of capacitor 230, resistor 231, and resistor 232 have first terminals and second terminals. A first terminal of capacitor 230 may be coupled to a first port of ports 212 of transformer circuit 112, and a second terminal of capacitor 230 may be coupled to ground node 235. A first terminal of resistor 231 may be coupled to a second port of ports 212 of transformer circuit 112, and a second terminal of resistor 231 may be coupled to ground node 235. A first terminal of resistor 232 may be coupled to a third port of ports 212 of transformer circuit 112, and a second terminal of resistor 232 may be coupled to ground node 235.

Transformer circuit 112 may include transformer circuitry to provide a power interface between cable side circuit 113 and physical layer circuit 111. Transformer circuit 112 may include a transformer, a plurality of ports 211 and 212, and other electrical and electronic components. A first set of ports, ports 211, may include receptacles or connection points at which components of cable side circuit 113 may be connected. A second set of ports, ports 212, may include receptacle or connection points at which components of physical layer circuit 111 may be connected. In an example, physical layer circuit 111 may be coupled to transformer circuit 112 at ports 212 as described above, and cable side circuit 113 may be coupled to transformer circuit 112 at ports 211. Transformer circuit 112 can provide power to respective circuits and components thereof via ports 211 and 212.

Cable side circuit 113 may be representative of circuitry capable of providing an interface between an industrial device, and components thereof, and communication cables 215 and 216 (e.g., an Ethernet cable having a pair of wires) connecting network interface system 200 to the communication network. Cable side circuit 113 may include various electrical and electronic components, such as resistors, capacitors, inductors, and the like, and cabling or wires connecting the components thereof.

More specifically, cable side circuit 113 may include capacitor 213, resistor 214, communication cable 215, communication cable 216, TVS circuit 220, communication cable 223, communication cable 224, communication cable 225, communication cable 226, ferrite bead 227, and capacitor 228.

Communication cables 215 and 216 may be representative of low-voltage cables that can couple the industrial device to the communication network via communication equipment (e.g., a switch, a router). In various examples, communication cables 215 and 216 may be first and second pairs of wires in a single Ethernet cable. However, in other examples, communication cables 215 and 216 may be separate Ethernet cables including any number of pairs of wires. Communication cable 215 may include a first connector (e.g., an RJ45 connector) coupled to a second port of ports 211 of transformer circuit 112 and a second connector coupled to a communication device connected to the communication network. Communication cable 216 may include a first connector (e.g., an RJ45 connector) coupled to a third port of ports 211 of transformer circuit 112 and a second connector coupled to a communication device connected to the communication network. In some examples, communication cables 215 and 216 are connected to the same communication device, however, in other examples, communication cables 215 and 216 are connected to different communication devices.

In various examples, capacitor 213 and resistor 214 may form a common-mode impedance dissipation circuit coupled to transformer circuit 112 at a first port of ports 211 of transformer circuit 112 to dissipate interference introduced by communication cables 215 and 216, for example. Capacitor 213 and resistor 214 each include a first terminal and a second terminal. A first terminal of resistor 214 may be coupled to transformer circuit 112 at the first port of ports 211, and a second terminal of resistor 214 may be coupled to capacitor 213 at a first terminal of capacitor 213. The second terminal of capacitor 213 may be coupled to chassis 101. Accordingly, capacitor 213 and resistor 214 may be coupled in series with each other. Capacitor 213 and resistor 214 may have respective characteristic values based on desired performance of cable side circuit 113, or more particularly, based on an amount of common-mode impedance interference occurring via signals passing through cable side circuit 113.

Similarly, TVS circuit 220, ferrite bead 227, and capacitor 228 may form an electrical fast transient (EFT) interference dissipation circuit coupled to communication cables 215 and 216 at respective ports 211 of transformer circuit 112 to dissipate other interference introduced by communication cables 215 and 216.

TVS circuit 220 may be representative of a voltage suppression circuit including ports 221, ports 222, and a plurality of diodes coupled to one or more of ports 221 and 222. TVS circuit 220 may be coupled to communication cables 215 and 216 at ports 211 of transformer circuit 112 to reduce excess transient voltage in network interface system 200. Specifically, TVS circuit 220 may be coupled to communication cable 215 at a first port of ports 221 and a first port of ports 222 and to communication cable 216 at a second port of ports 221 and a second port of ports 222. TVS circuit 220 may be configured to turn on and conduct when excess transient voltage flows through cable side circuit 113. One of ports 221 may be a ground port that can couple TVS circuit 220 to ferrite bead 227 and capacitor 228 to discharge such excess voltage to chassis 101.

Ferrite bead 227 and capacitor 228 each have first and second terminals. A first terminal of ferrite bead 227 may be coupled to the ground port of ports 221 of TVS circuit 220. A second terminal of ferrite bead 227 may be coupled to a first terminal of capacitor 228. The second terminal of capacitor 228 may be coupled to chassis 101. Ferrite bead 227 and capacitor 228 may have respective characteristic values based on a desired performance of the dissipation circuit, or more specifically, based on an amount of EFT interference to be dissipated at various frequency ranges. The amount of EFT interference, the impedance thereof, and the frequency range thereof may depend on various factors. Examples of these factors may include dimensions of network interface system 200, such as a size and thickness of a circuit board (e.g., a printed circuit board) on which network interface system 200 may be implemented, lengths of communication cables coupled to components of network interface system 200, a type of the communication cables, a distance between the communication cables and elements of cable side circuit 113, dimensions of traces coupling components of network interface system 200 together (e.g., copper traces) on a circuit board, and more.

In one example, ferrite bead 227 may include characteristics and electrical properties exemplary of ferrite bead model "TMSB_0402_74269244182_1800 ohm" from Würth Elektronik GmbH & Co. KG. In such an example, the impedance of ferrite bead 227 at 100 MHz may be approximately 1800 Ohms, the impedance at 1000 MHz may be approximately 1500 Ohms, the maximum impedance measured at 450 MHz may be approximately 2700 Ohms, the rated current may be approximately 210 milliamps, and the DC resistance measured at 20 degrees Celsius may be approximately 2 Ohms. In this example, capacitor 228 may have a capacitance of 15 nano-farads (nF). Other combinations and variations of models, characteristics, and properties of ferrite bead 227 and capacitor 228 may be contemplated for use in passing a 100 kHz EFT test.

In operation, signals may travel from cable side circuit 113 to transformer circuit 112 and to physical layer circuit 111 and from physical layer circuit 111 to transformer circuit 112 to cable side circuit 113. Transients or interference bursts may be injected into network interface system 200 from an external source or from one or more of communication cables 215, 216, 223, 224, 225, and 226 during operation (e.g., an EFT). The first port of ports 211 of transformer circuit 112 may be a grounding port coupled to chassis 101, a protecting ground node, through resistor 214 and capacitor 213. When such transients or bursts occur, signals having interference may flow to the grounding port to chassis 101. Additionally, TVS circuit 220 may be coupled between communication cables 215 and 216 and transformer circuit 112 to dissipate further interference when a voltage of the signals exceeds a threshold value. Like transformer circuit 112, TVS circuit 120 also includes a grounding port coupled to chassis 101 through ferrite bead 227 and capacitor 228. Chassis 101 may act as an energy bounce-back source if such interference is not dissipated through resistor 214 and capacitor 213 and/or ferrite bead 227 and capacitor 228, the interference may disrupt operations of the industrial device and damage components of the industrial device. Accordingly, resistor 214 and capacitor 213 may function as a common-mode interference dissipation circuit configured to reduce common-mode impedance interference introduced to network interface system 200, and ferrite bead 227 and capacitor 228 may function as an EFT interference circuit configured to reduce resonant ringing caused by EFT bursts.

More particularly, characteristic values of resistor 214 and capacitor 213 may be selected to match an impedance value of the common-mode impedance interference at or within a frequency range, such that when an interference signal passes through resistor 214 and capacitor 213, the common-mode impedance interference dissipates. Additionally characteristic values of ferrite bead 227 and capacitor 228 may be selected to match an impedance value of the EFT interference at or within an EFT frequency range, such that when an EFT burst causes an increase in voltage in a communication signal, TVS circuit 220 can turn on and dissipate interference caused by the EFT burst through ferrite bead 227 and capacitor 228. Advantageously, by including ferrite bead 227, signals having noise in ranges corresponding to a 100 kHz EFT burst may be dissipated quickly given unique resistance and impedance characteristics of ferrite bead 227. This may not only improve design performance by reducing noise in a system or device, but also decrease design costs as ferrite beads may reduce the number of electrical components required to dissipate interference among various frequency ranges.

In other examples, however, ferrite bead 227 may instead be replaced by an inductor and a resistor in series with each other. The values and characteristics of the inductor and resistor package may be selected based on a desired dissipation performance of the package. In any case, the value of capacitor 228 may be a value between approximately 1 nano-farad (nF) and 100 nF.

Figure 3:
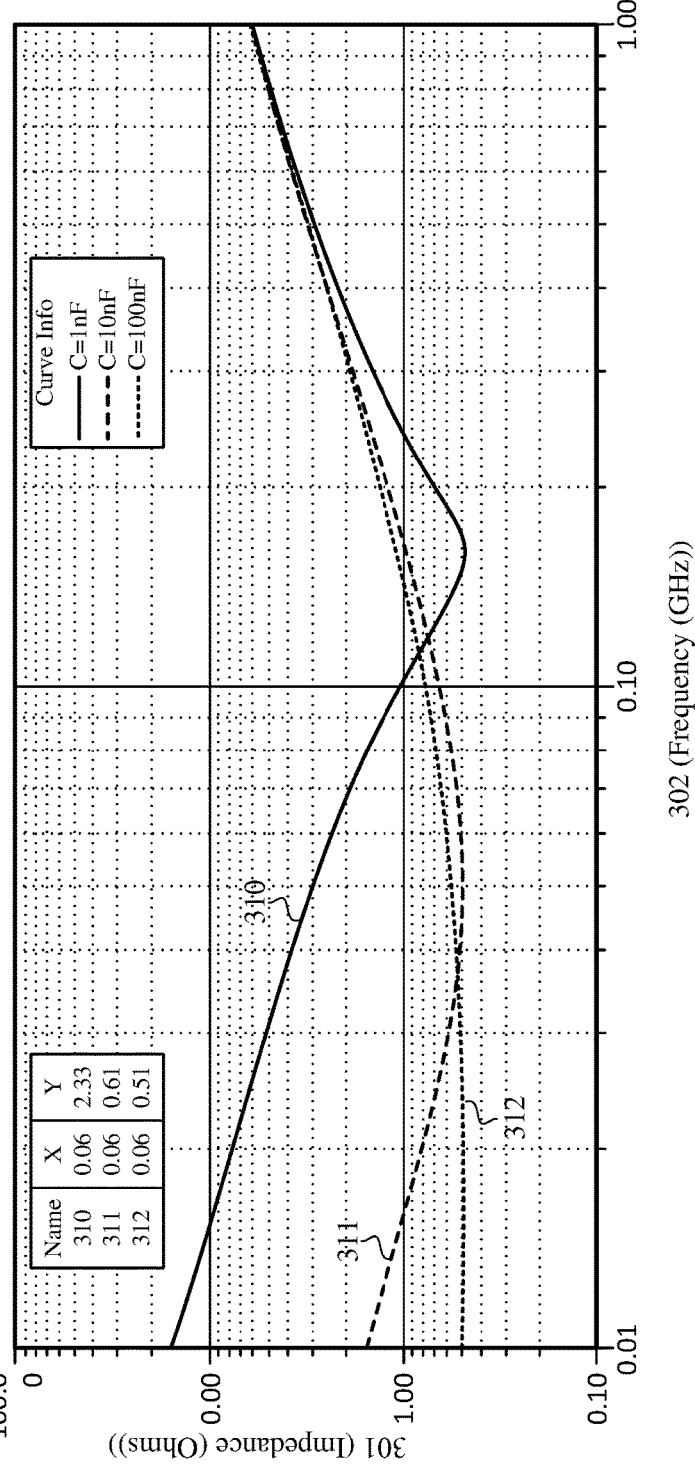
FIG. 3 illustrates an example graphical representation of measurements of a network interface system in accordance with some embodiments of the present technology.

FIG. 3 illustrates an example graphical representation of measurements of a network interface system in accordance with some embodiments of the present technology. FIG. 3 illustrates graphical representation 300, which includes waveforms 310, 311, and 312 with respect to impedance 301 and frequency 302, and which references elements of FIG. 2.

Waveforms 310, 311, and 312 may be representative of measurement of impedance 301 identified at a node of a network interface system 200 across different values of frequency 302, such as at a first port of ports 211 of transformer circuit 112. Waveform 310 may include values of impedance 301 when using capacitor 228 with a value of 1 nano-farad (nF). Waveform 311 may include values of impedance 301 when using capacitor 228 with a value of 10 nF. Waveform 312 may include values of impedance 301 when using capacitor 228 with a value of 100 nF.

In various examples, ferrite bead 228 may be selected to dissipate interference within a frequency range of approximately 50 MHz to 500 MHz, or 0.05 GHz to 0.5 GHz. At 0.06 GHZ, a value of frequency 302 within this range, waveform 310 may include a value of impedance 301 of 2.33 Ohms, waveform 311 may include a value of impedance 301 of 0.61 Ohms, and waveform 312 may include a value of impedance 301 of 0.51 Ohms. Importantly, within the frequency range between 50-500 MHZ, the value of capacitor 228 may be selected between 1 nF and 100 nF with negligible impact so long as ferrite bead 227 is selected to impede impedance 301 at such ranges of frequency 302 (e.g., ferrite bead model "TMSB_0402_74269244182_1800 ohm" from Würth Elektronik GmbH & Co. KG).

Figure 4:
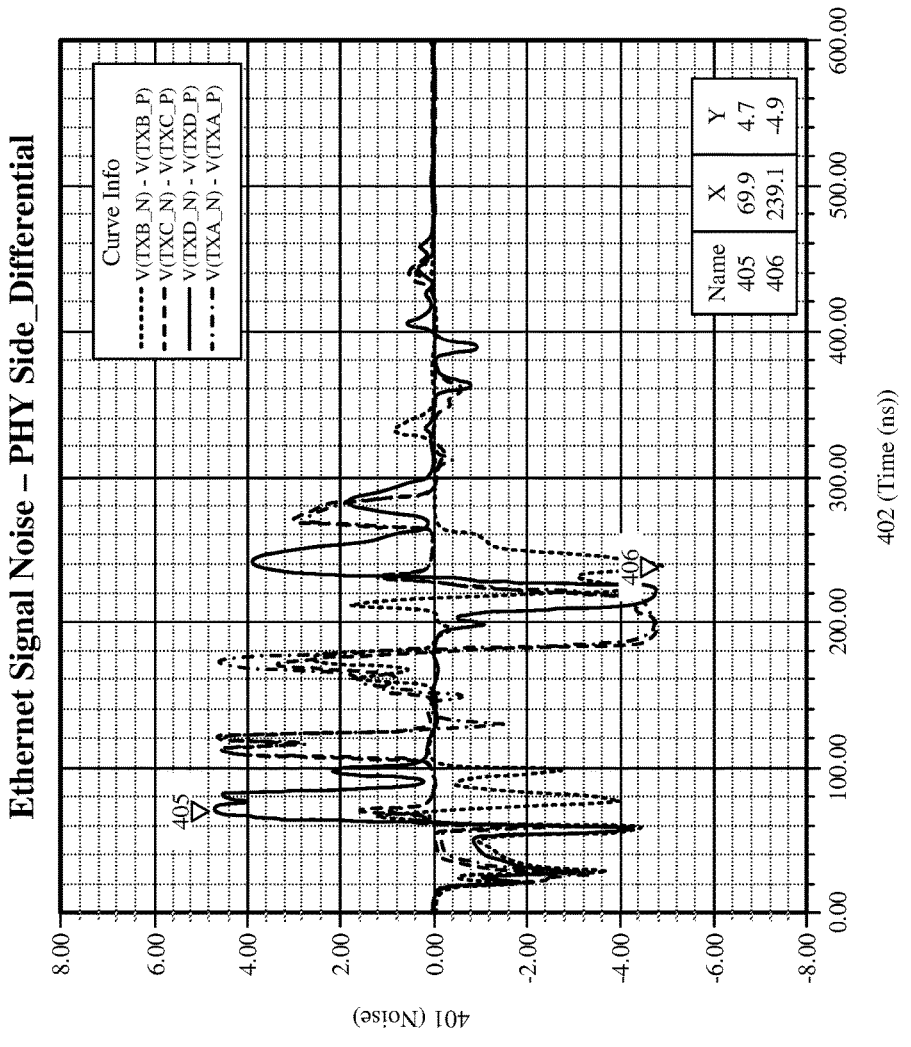
FIG. 4 illustrates an example graphical representation of measurements of a network interface system in accordance with some embodiments of the present technology.

FIG. 4 illustrates an example graphical representation of measurements of a network interface system in accordance with some embodiments of the present technology. FIG. 4 illustrates graphical representation 400, which includes sample signal noise waveforms with respect to noise 401 and time 402, and which references elements of FIG. 2.

Graphical representation 400 is illustrative of values of noise 401 measured at different nodes of network interface system 200 over time 402. More particularly, noise 401 may be measured at one or more of ports 212 of transformer circuit 112 that couple transformer circuit 112 to physical layer circuit 111 of network interface system 200.

In an example, for network interface system 200 to pass one or more interference standard tests mandated by the IEC, network interface system 200 may be required to maintain synchronization without more than two consecutive bits with errors caused by interference in any interval of 60 bits. This interval may occur over approximately 480 nanoseconds. As illustrated by graphical representation 400, the values of noise 401 may reduce to approximately zero in 480 nanoseconds. Accordingly, the topology and components of network interface system 200 may be configured to pass interference tests, such as an EFT test, including such a requirement.

Figure 5:
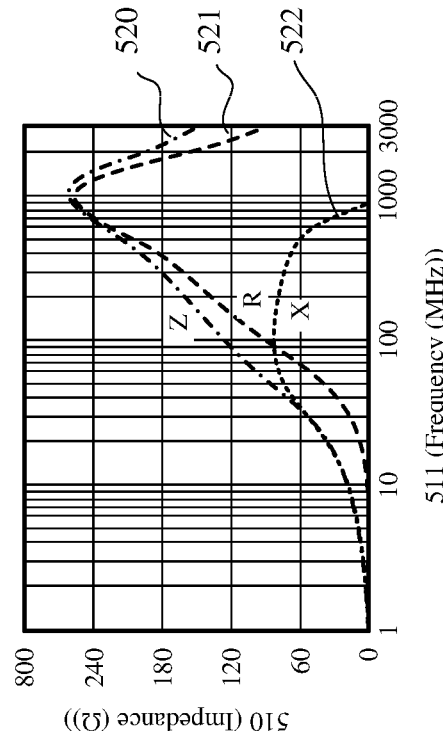
FIG. 5 illustrates example graphical representations of ferrite bead characteristics in accordance with some embodiments of the present technology.
Figure 5:
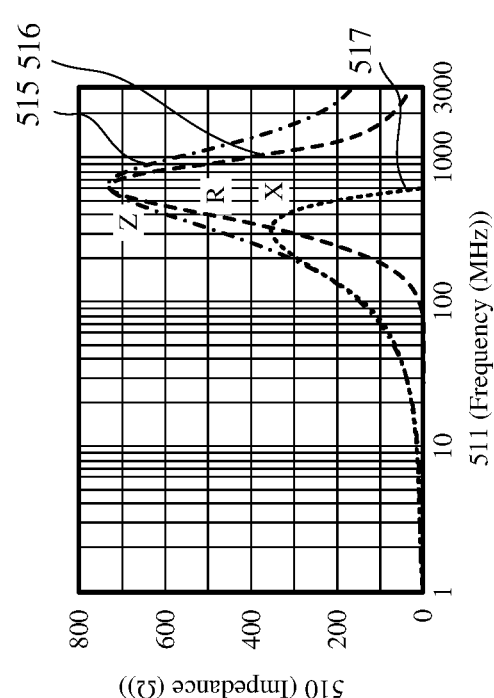

FIG. 5 illustrates example graphical representations of ferrite bead characteristics in accordance with some embodiments of the present technology. FIG. 5 includes graphical representations 500 and 501. Graphical representation 500 includes waveforms 515, 516, and 517, which relate to impedance, resistance, and reactance, respectively. Graphical representation 501 includes waveforms 520, 521, and 522, which also relate to impedance, resistance, and reactance, respectively.

In various examples, a network interface system (e.g., network interface system 110-1 of FIG. 1), or a subsystem thereof (e.g., cable side circuit 113-1), may include a ferrite bead (e.g., ferrite bead 227 of FIG. 2) having impedance, resistance, and reactance characteristics at varying frequencies that can reduce interference in the network interface system. One example set of characteristics of a ferrite bead may be exemplified by graphical representation 500, while a different set of characteristics of a ferrite bead may be exemplified by graphical representation 501.

Graphical representation 500 shows waveforms 515, 516, and 517, which show characteristics of a given ferrite bead in impedance 510 with respect to frequency 511. More specifically, waveform 515 may show an impedance characteristic at varying frequencies, waveform 516 may show a resistance characteristic at varying frequencies, and waveform 517 may show a reactance characteristic at varying frequencies. Similarly, graphical representation 501 shows waveforms 520, 521, and 522, which show characteristics of a given ferrite bead in impedance 510 with respect to frequency 511. More specifically, waveform 520 may show an impedance characteristic at varying frequencies, waveform 521 may show a resistance characteristic at varying frequencies, and waveform 522 may show a reactance characteristic at varying frequencies. In various examples, the ferrite bead may be selected to have such characteristics that can filter or reduce interference within a range of frequency 511 between 50 MHz and 500 MHz. Accordingly, the ferrite bead with characteristics shown by graphical representation 500 may be used to reduce interference between such frequencies with an impedance 510 between 100 and 700 Ohms. The ferrite bead with characteristics shown by graphical representation 501 may be used to reduce interference between such frequencies with an impedance 510 between 60 and 180 Ohms.

While two example characteristic-curves of ferrite beads are shown in FIG. 5, other ferrite beads may be selected based on their characteristic-curves to reduce a desired amount of interference in a desired frequency range.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for" but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A system, comprising:
a transformer circuit comprising a plurality of transformer ports including a first set of transformer ports and a second set of transformer ports;
a physical layer circuit coupled to the transformer circuit at the second set of transformer ports of the plurality of transformer ports;
a cable side circuit coupled to the transformer circuit at the first set of transformer ports, wherein the cable side circuit comprises:
a connector port comprising:
a receptacle; and
a set of output ports that couple to a subset of the first set of transformer ports; and
an interference dissipation circuit comprising:
a transient voltage suppression (TVS) sub-circuit including a plurality of TVS ports, wherein the TVS sub-circuit is coupled to the set of output ports at a first set of TVS ports of the plurality of TVS ports;
a ferrite bead having a first terminal and a second terminal; and
a capacitor coupled in series with the ferrite bead and having a first terminal and a second terminal;
wherein the first terminal of the ferrite bead is coupled to a ground port of the plurality of TVS ports, the second terminal of the ferrite bead is coupled to the first terminal of the capacitor, and the second terminal of the capacitor is coupled to a chassis in an industrial automation environment.

2. The system of claim 1, wherein:
the ferrite bead comprises a set of interference dissipation characteristics; and
the ferrite bead is selected based on an Electrical Fast Transient (EFT) interference measured at one or more of the plurality of TVS ports.

3. The system of claim 2, wherein the ferrite bead is selected further based on one or more of:
a type of the system;
dimensions of the system; and
a type of industrial automation device coupled to the cable side circuit at the receptacle of the connector port of the cable side circuit.

4. The system of claim 3, wherein the system is one of: a programmable logic controller (PLC), a drive, a chassis-based communication module, a network controller, an I/O module, and an Ethernet IP adaptor in the industrial automation environment.

5. The system of claim 3, wherein the dimensions comprise:
a length of an Ethernet cable connecting the industrial automation device and the cable side circuit;
a size of the system; and
a distance between the cable side circuit and the transformer circuit.

6. The system of claim 1, wherein the physical layer circuit includes:
a capacitor coupled to a first transformer port of the second set of transformer ports;
a first resistor coupled to a second transformer port of the second set of ports; and
a second resistor coupled to a third transformer port of the second set of transistor ports;
wherein the capacitor, the first resistor, and the second resistor are coupled together at a ground node.

7. The system of claim 6, wherein the first resistor has a resistance of approximately fifty (50) Ohms, and wherein the second resistor has a resistance of approximately fifty (50) Ohms.

8. The system of claim 2, wherein the ferrite bead limits the EFT interference within a frequency range between fifty (50) MHz and five-hundred (500) MHz.

9. The system of claim 1, wherein the cable side circuit further comprises a common-mode interference dissipation circuit comprising:
a resistor having a first terminal and a second terminal; and
a capacitor coupled in series with the resistor and having a first terminal and a second terminal;
wherein the first terminal of the resistor is coupled to a port of the first set of ports of the transformer circuit, the second terminal of the resistor is coupled to the first terminal of the capacitor, and the second terminal of the capacitor is coupled to the chassis.

10. The system of claim 6, wherein the capacitor of the physical layer circuit has a capacitance of approximately 0.1 microfarads.

11. The system of claim 1, wherein the receptacle of the connector port receives a connector of an Ethernet cable in the industrial automation environment.

12. The system of claim 1, wherein a capacitance value of the capacitor of the interference dissipation circuit is based on an EFT interference measured at one or more of the plurality of TVS ports.

13. The system of claim 12, wherein the capacitance value is a value between one (1) nF and one-hundred (100) nF.

14. The system of claim 1, wherein the TVS sub-circuit further includes one or more TVS connector ports, each TVS connector port comprising:
a TVS receptacle; and
a set of TVS output ports that couple to a second set of TVS ports;
wherein each TVS receptacle receives a connector of an Ethernet cable in the industrial automation environment.

15. The system of claim 14, wherein the ferrite bead is selected based on an EFT interference measured at the one or more TVS connector ports.

16. An interference dissipation circuit, comprising:
a transient voltage suppression (TVS) sub-circuit including a plurality of TVS ports, wherein the TVS sub-circuit is coupled to a set of output ports at a first set of TVS ports of the plurality of TVS ports;

a ferrite bead having a first terminal and a second terminal; and a capacitor coupled in series with the ferrite bead and having a first terminal and a second terminal;

wherein the first terminal of the ferrite bead is coupled to a ground port of the plurality of TVS ports, the second terminal of the ferrite bead is coupled to the first terminal of the capacitor, and the second terminal of the capacitor is coupled to a chassis in an industrial automation environment.

17. The interference dissipation circuit of claim 16, wherein:

the ferrite bead comprises a set of interference dissipation characteristics; and the ferrite bead is selected based on an Electrical Fast Transient (EFT) interference measured at one or more of the plurality of TVS ports.

18. The interference dissipation circuit of claim 17, wherein the ferrite bead is selected further based on one or more of:

a type of industrial automation device coupled to the TVS sub-circuit at one or more TVS ports of the plurality of TVS ports; and dimensions of the industrial automation device, wherein the dimensions comprise:

a length of an Ethernet cable connecting the industrial automation device and the TVS sub-circuit; and a size of the industrial automation device.

19. The interference dissipation circuit of claim 18, wherein the industrial automation device is one of:

a programmable logic controller (PLC), a drive, a chassis-based communication module, a network controller, an I/O module, and an Ethernet IP adaptor in the industrial automation environment.

20. The interference dissipation circuit of claim 17, wherein the ferrite bead limits the EFT interference within a frequency range between fifty (50) MHz and five-hundred (500) MHz.

* * * * *